United States Patent
Talwar et al.

(10) Patent No.: US 9,015,948 B2
(45) Date of Patent: Apr. 28, 2015

(54) JOINING FUSELAGE SKINS USING FRICTION STIR WELDING

(75) Inventors: Rajesh Talwar, Frontenac, MO (US); Richard Lederich, Des Peres, MO (US)

(73) Assignee: The Boeing Company, Chicago, IL (US)

(*) Notice: Subject to any disclaimer, the term of this patent is extended or adjusted under 35 U.S.C. 154(b) by 1939 days.

(21) Appl. No.: 12/017,007

(22) Filed: Jan. 19, 2008

(65) Prior Publication Data

US 2009/0184201 A1 Jul. 23, 2009

(51) Int. Cl.
*B21D 53/88* (2006.01)
*B23K 20/12* (2006.01)
*B23P 6/00* (2006.01)
*B23K 20/24* (2006.01)

(52) U.S. Cl.
CPC ....... *B23K 20/1255* (2013.01); *Y10T 29/49622* (2015.01); *Y10T 29/49728* (2015.01); *B23P 6/00* (2013.01); *B23K 20/24* (2013.01); *B23K 2201/34* (2013.01); *B23K 2203/10* (2013.01)

(58) Field of Classification Search
CPC ......... B23P 6/00; B23C 1/20; B23K 20/1255; B23K 20/24; B23K 2201/34; B23K 2203/10; Y10T 29/49622; Y10T 29/49728
USPC .............. 29/897.2, 402.06, 402.07, 402.16; 228/114.5, 164–167, 170–172, 173.3; 427/446, 540; 244/119, 123.1
See application file for complete search history.

(56) References Cited

U.S. PATENT DOCUMENTS

| | | | | | |
|---|---|---|---|---|---|
| 2,177,868 | A | * | 10/1939 | Chapman | 219/76.14 |
| 3,606,672 | A | * | 9/1971 | Terai | 228/172 |
| 3,629,932 | A | * | 12/1971 | Richter | 228/172 |
| 3,733,686 | A | * | 5/1973 | Maucher | 228/165 |
| 5,460,317 | A | * | 10/1995 | Thomas et al. | 228/112.1 |
| 5,611,479 | A | * | 3/1997 | Rosen | 228/112.1 |
| 5,769,306 | A | * | 6/1998 | Colligan | 228/112.1 |
| 6,045,028 | A | * | 4/2000 | Martin et al. | 228/112.1 |
| 6,051,325 | A | * | 4/2000 | Talwar et al. | 428/593 |
| 6,068,178 | A | * | 5/2000 | Michisaka | 228/112.1 |
| 6,199,745 | B1 | * | 3/2001 | Campbell et al. | 228/112.1 |
| 6,779,704 | B2 | * | 8/2004 | Nelson et al. | 228/112.1 |
| 7,066,375 | B2 | * | 6/2006 | Bolser | 228/114 |
| 7,210,610 | B2 | * | 5/2007 | Nelson et al. | 228/2.1 |
| 7,225,966 | B2 | * | 6/2007 | Christner | 228/112.1 |
| 7,748,598 | B2 | * | 7/2010 | Want | 228/164 |
| 2004/0041006 | A1 | * | 3/2004 | Masingale | 228/112.1 |
| 2008/0268279 | A1 | * | 10/2008 | Want | 428/615 |

* cited by examiner

*Primary Examiner* — Ryan J Walters
(74) *Attorney, Agent, or Firm* — Parsons Behle & Latimer

(57) ABSTRACT

Fuselage skins of aircraft are joined using friction stir welding. A strip of cladding is removed from the skins along an abutment between the skins before the skins are welded in order to prevent the cladding from interfering with the welding process. The cladding is replaced after the welding is completed.

20 Claims, 5 Drawing Sheets

JOINING FUSELAGE SKINS USING FRICTION STIR WELDING

TECHNICAL FIELD

This disclosure generally relates to welding processes and aircraft fabrication techniques, and deals more particularly with a method for joining clad metal parts, such as fuselage skins.

BACKGROUND

A wide range of structures in the aircraft industry are fabricated from aluminum alloys because of their relatively high strength-to-weight ratio. For example, aluminum skins may be used to form the fuselage, wings and other exterior surfaces on aircraft. The aluminum sheets are commonly joined together using mechanical fasteners, such as rivets. The aluminum sheets used in these applications typically comprise a thin layer lightly alloyed aluminum laminated onto each side of an aluminum alloy sheet in order to improve corrosion resistance and structural performance of the skin. One such aluminum laminate known as "Alclad" available from the Alcoa Corporation, comprises a corrosion resistant aluminum sheet formed from sacrificial aluminum surface layers metallurgically bonded to high strength aluminum alloy core material.

Fabricating aluminum skins using mechanical fasteners is a robust and well established process, but is time consuming and labor intensive. Moreover, the mechanical fasteners and splice plates required to join the skin sections add weight to the aircraft.

Accordingly, there is a need for a method of joining clad metal skins that eliminates the need for fasteners and reduces fabrication time.

SUMMARY

Embodiments of the disclosure provide a method of joining clad metal skins using friction welding, thereby eliminating the need for mechanical fasteners and splice plates. Strong, uniform butt joint welds between skin sections are achieved by removing a strip of the cladding along edges of the skins before they are welded. Following welding, the cladding is replaced in order to maintain continuous corrosion protection over the entire surface of the skin.

In accordance with one disclosed embodiment, a method of joining clad metal aircraft skins comprises: removing a layer of clad material from each of the skins along an edge of the skin; placing the edges of the skins in edge-to-edge abutment with each other; welding the skins along the abutting edges; and, replacing at least a portion of the removed clad layer of material along the edges. The layer of clad material may be removed by any of several processes, such as pickling, chemical etching, mechanical abrasion, or machining. The cladding may be replaced by any of several processes, such as flame spray and cold spray. The welding may be performed by friction stir welding in which a rotating tool is held against the surface of the skins in the area where the clad material has been removed. The skins may be formed into a desired structural shape before the welding is performed.

According to another disclosed embodiment, a method is provided of welding two clad metal fuselage skins, comprising: forming an abutment between opposing edges of the skins; removing a layer of cladding from one side of the skins along the abutment; and, friction stir welding the edges of the skins together along the abutment after the layer of cladding has been removed. The method may further comprise removing a thin layer of metal from each of the skins beneath the cladding.

In accordance with another disclosed embodiment, a clad metal aircraft subassembly may be fabricated by: forming two clad metal sheets into a desired subassembly shape; removing the cladding along an edge of one side of each of the two metal sheets; placing edges of the two metal sheets in contact with each other to form an abutment; joining the two metal sheets by friction welding the metal sheets along the abutment; and, after the metal sheets have been joined, replacing the cladding on the metal sheets in the area where the cladding has been removed.

The disclosed embodiment satisfy the need for a method of joining clad metal skins that obviates the need for fasteners and splice plates, while reducing fabrication time. Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
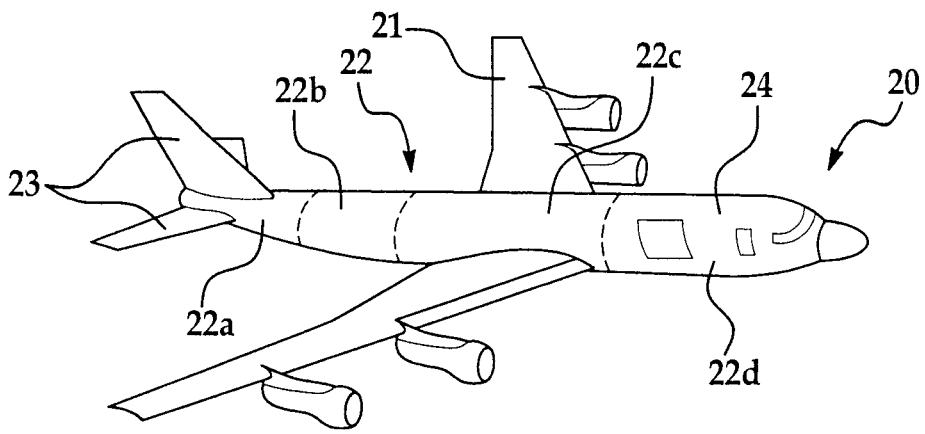
FIG. 1 is a perspective view of an aircraft having outer metal skin sections joined using friction stir welding.
Figure 2:
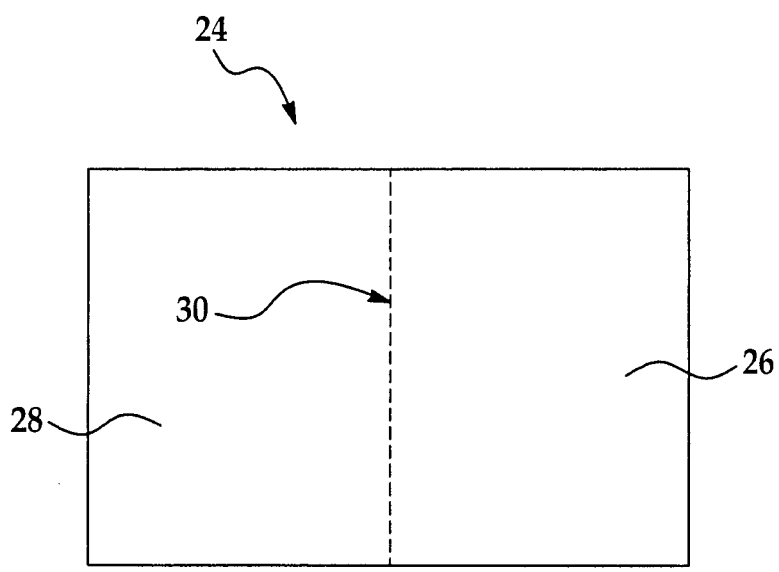
FIG. 2 is a plan view of two skin sections welded along a straight line.
Figure 3:
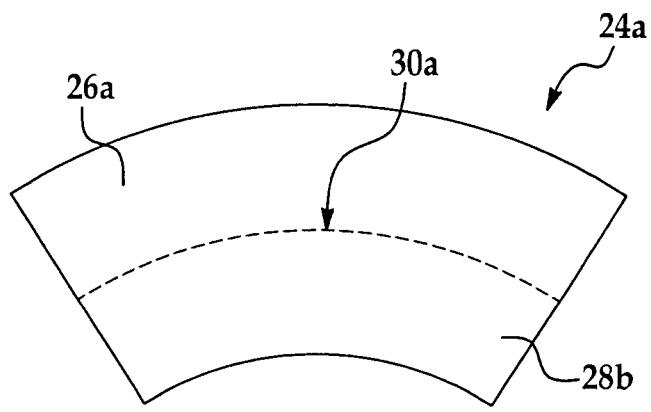
FIG. 3 is a plan view of two arcuate skin sections welded along an arcuate line.

Referring first to FIGS. 1-3, an aircraft 20 may include various subassemblies such as a fuselage 22, wings 21, and stabilizers 23 covered with a clad metal skin 24 that may be flat or curved along one or more axes. The fuselage 22, for example, may comprise separate barrel sections 22a, 22b, 22c, 22d that are joined together during fabrication of the aircraft 20. As part of the fabrication process, sections 26, 28 of the skin 24 are joined together by a splice 30 which, in the case of FIG. 2, is a straight line. However, curved skin sections 28a, 28b may be joined at a splice line 30a that is curved along one or more axes, as shown in FIG. 3.

Referring now also to FIGS. 4-10, the skin sections 26, 28 may comprise sheets of metal material covered on one or both outer surfaces 25, 27 with a layer of cladding 40. In the illustrated example, only surface 27 has a protective clad layer 40. The metal from which skin sections 26, 28 are formed may comprise any of a variety of aluminum alloys. The clad layer 40 may comprise a material that provides sacrificial corrosion resistance to protect the structural metal alloy from which the skin sections 26, 28 are formed, such as a lightly alloyed aluminum alloy.

Figure 4:
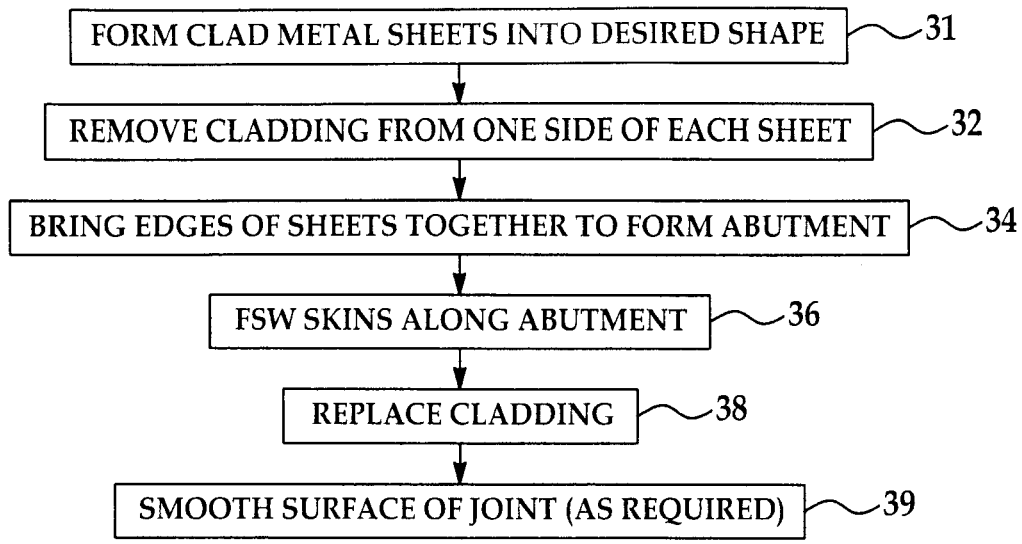
FIG. 4 is a flow diagram illustrating the overall steps of a disclosed method embodiment.
Figure 5:
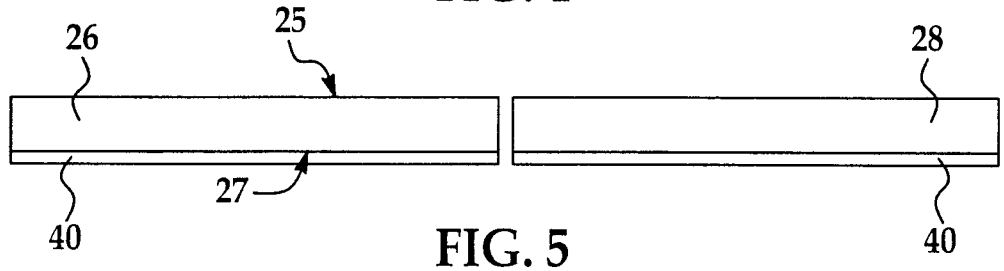
FIG. 5 is a side view of two clad metal sheets before being joined.
Figure 6:
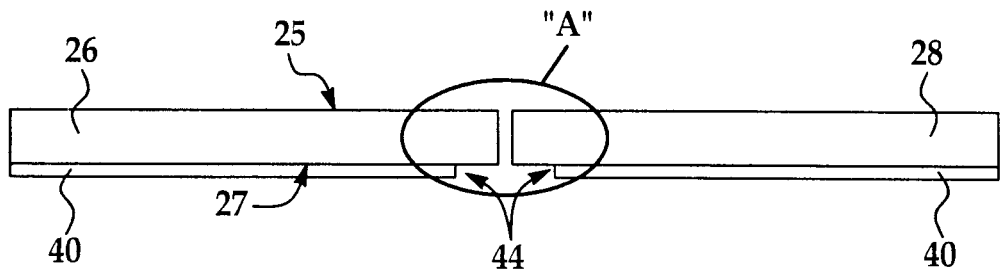
FIG. 6 is a view similar to FIG. 5 but showing a strip of cladding having been removed from each of the sheets.
Figure 7:
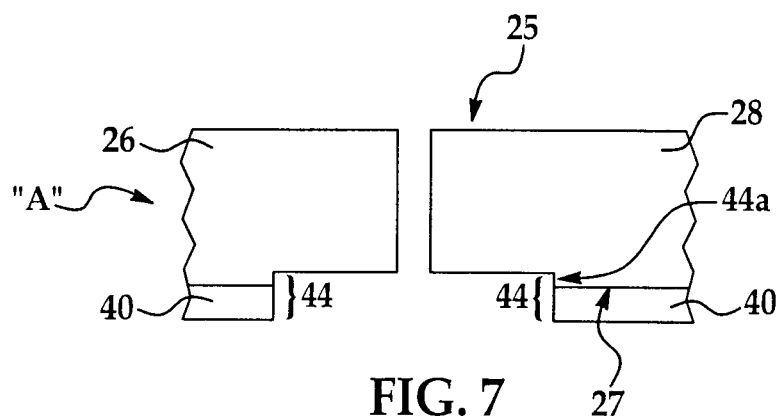
FIG. 7 is an enlarged view of the area indicated as "A" in FIG. 6.

As shown in FIG. 4 depending upon the shape of the subassembly to be formed, the clad metal skin sections 26, 28 are first formed into a desired shape, as shown at step 31. The formed skin sections 26, 28 are then aligned as shown in FIG. 5, and a layer of material 44 is removed from the bottom 27 or root side of the skin sections 26, 28, as shown at step 32. The layer of material 44 may include a relatively uniform strip along the edges of the skin sections 26, 28. The removed layer 44 includes the entire layer of clad material 40, and may also include a thin layer 44a of the metal forming skin sections 26, 28. The layer of material 44 may be removed by any of a variety of known techniques such as, without limitation, pickling, chemical etching, mechanical abrasion or machining. The width of the material 44 that is removed will depend on the particular application and the thickness of the clad layer 40. In one application, for example, where the clad layer 40 is approximately 0.002 inches thick, the width of the layer of material 44 that is removed may be approximately 0.5 inches.

Figure 8:
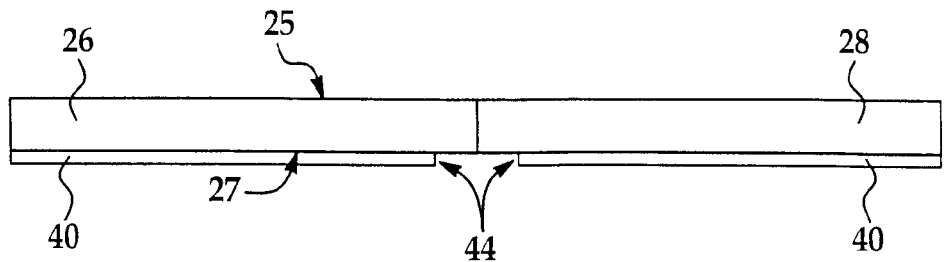
FIG. 8 is a view similar to FIG. 6 but showing the two sheets abutting each other.
Figure 9:
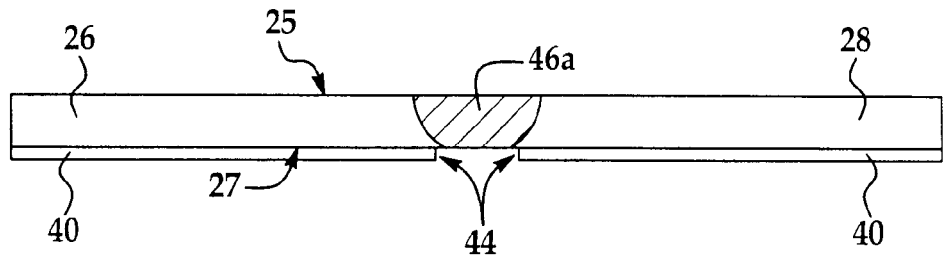
FIG. 9 is a view similar to FIG. 8 but showing a friction stir weld along the abutment.
Figure 10:
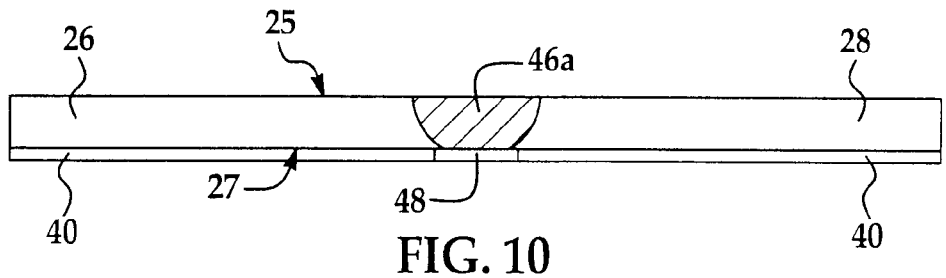
FIG. 10 is a view similar to FIG. 9, but showing the clad material having been replaced.

Next, as shown in FIG. 8, edges of the skin sections 26, 28 are brought into contact with each other to form an abutment 46, as shown at step 34 in FIG. 4. Next, at step 36, the abutment 46 is friction welded, creating a welded butt joint shown at 46a in FIG. 9. Next, at step 38 (FIG. 4), a layer of cladding 48 is reapplied in the area beneath the weld 46a to replace the layer 44 of cladding that has been previously removed. The replacement layer of cladding 48 may be reapplied by any of a variety of processes, including air plasma spray, combustion powder spray, high velocity oxy fuel, cold spray, electric arc wire spray, combustion wire spray, ROKIDE®, or flame spray. After the replacement layer of cladding 48 has been applied, the surfaces 25, 27 may be smoothed along the welded butt joint 46a, as required, as indicated at step 39.

It should be noted here that while the skin sections 26, 28 illustrated in the drawings have a clad layer 40 applied only to the bottom surface 27, in some applications, the top surface 25 may also include a layer of cladding (not shown). In this event, the cladding applied to the top surface 25 may be partially removed and then later reapplied in order to accommodate FSW of the abutment 46.

Figures 11, 12:
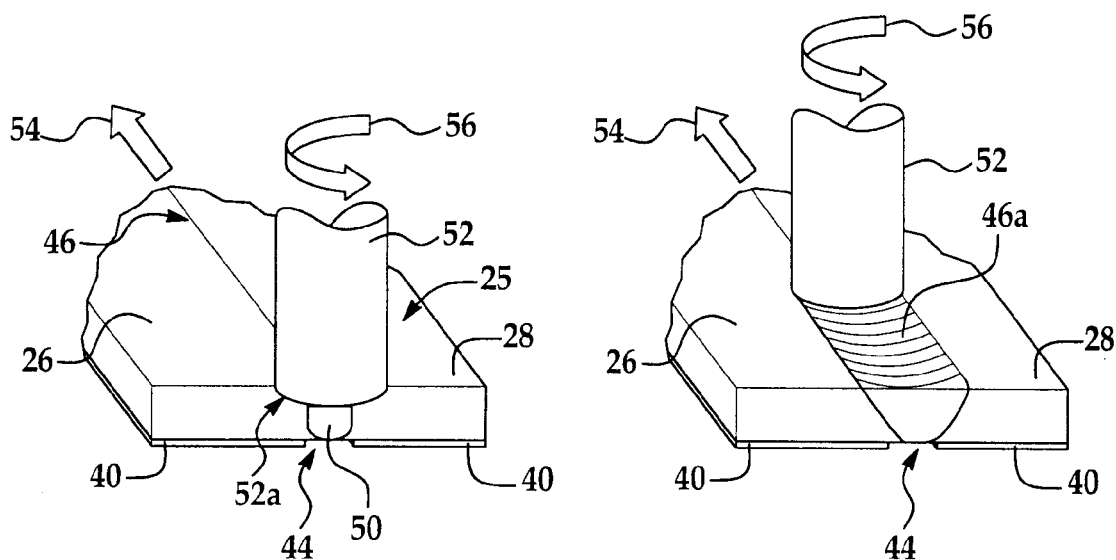
FIG. 11 is a perspective view showing a friction stir welding tool ready to initiate a weld between two skin sections.
FIG. 12 is a view similar to FIG. 11 but showing the weld having been partially completed.
Figure 13:
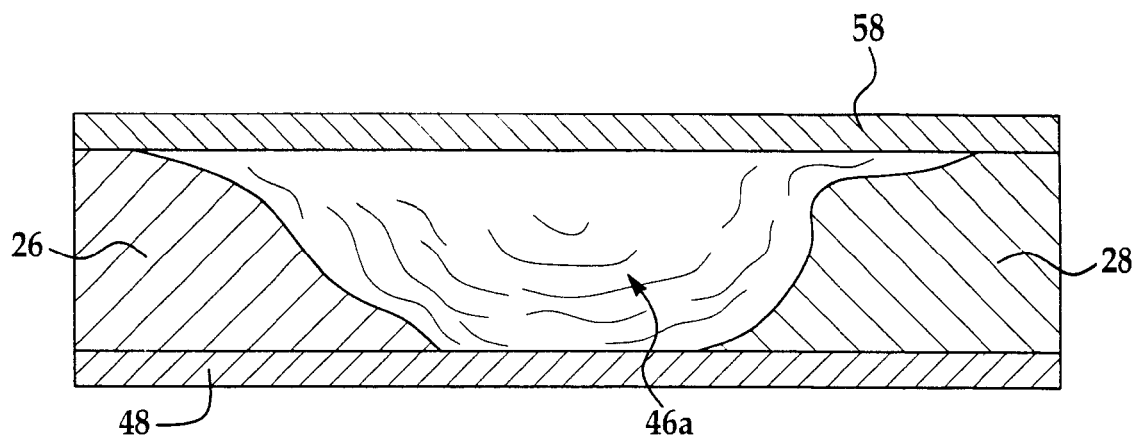
FIG. 13 is a sectional view showing the weld after the clad layer has been replaced.

Referring now also to FIGS. 11-13, the skin sections 26, 28 may be welded together along the abutment 46 using a friction stir welding (FSW) machine (not shown) which includes a motor (not shown) that rotates a cylindrical tool assembly 25. The tool assembly 25 includes an outer cylindrical tool 52 which is rotated, for example, in the direction of the arrow 56. A probe or pin 50 passes through the center of the tool 52 and is rotated by the motor (not shown) either in the same or in the opposite direction of rotation 56 of the tool 52. Tool 52 includes a shoulder 52a on its bottom surface which frictionally engages the top surface 25 of skin sections 26, 28.

The tool assembly 25 is displaced along the line of the abutment 46 as the tool 52 and pin 50 are rotated. In the illustrated embodiment, the pin 50 extends below the shoulder 52a to a point slightly above the bottom surface 27 of skin sections 26, 28. Skin sections 26, 28 may be clamped together or to another surface (not shown) so that they are not forced apart by the force imposed on them by the tool assembly 25 during the welding process.

Heat is generated by the frictional engagement between the skin sections 26, 28 and the tool shoulder 52. This heat, along with the heat generated by mechanical mixing produced by the pin 50, cause the stirred materials to soften without reaching their melting point, allowing the tool assembly 25 to traverse along the abutment 46 in a plasticized tubular shaft of metal. As the pin 50 moves in the direction of welding, the leading face of the pin 50, assisted by the pin profile, forces plasticized material to the back of the pin 50 while applying substantial forging force to consolidate the weld material. The welding of the material is facilitated by severe plastic deformation in a solid state involving dynamic recrystallization of the base material. The solid state nature of the FSW process combined with the profile of the tools 50, 52 result in a highly characteristic microstructure. Due to the fact that a strip 44 of the cladding 40 has been removed along the root side (surface 27) of the skin sections 26, 28, the layer of cladding 40 does not interfere with the plastic deformation and recrystallization process as the abutment 46 is being welded.

FIGS. 12 and 13 show a completed FSW weld 46a along the abutment 46 produced by the FSW process. In FIG. 13, a top layer 58 of cladding has been applied, and a layer of cladding 48 has been reapplied in the area 44 where the cladding 44 was removed prior to the FSW process.

Figure 14:
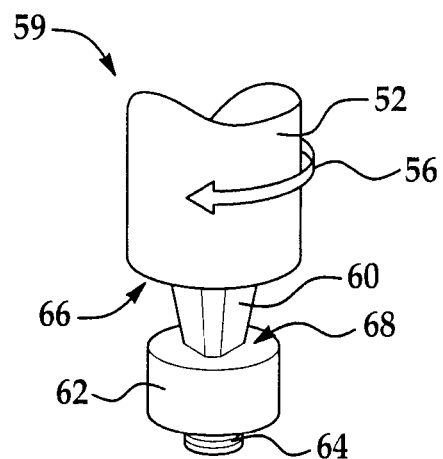
FIG. 14 is an isometric view of an alternate form of a friction stir weld tool that may be used to perform the welding process.
Figure 15:
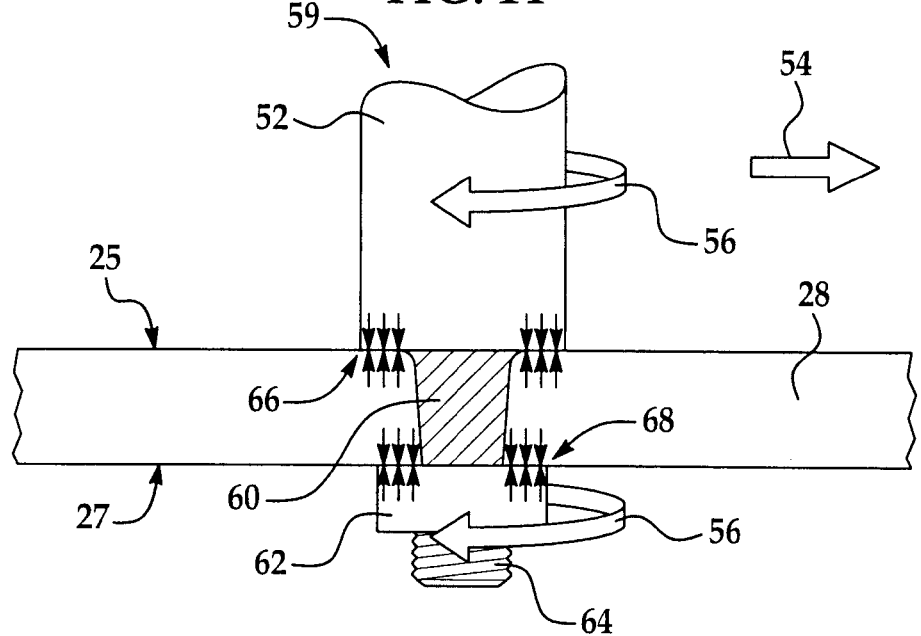
FIG. 15 is a sectional view showing the weld tool of FIG. 14 during the welding process.

FIGS. 14 and 15 illustrate an alternate FSW tool assembly 59 that includes a cylindrical tool body 52, a pin 60 and a bobbin-like ring 68 threaded onto a tip 64. The tool body 52 includes a bottom shoulder 66 that frictionally engages the top surface 25 of the skin sections 26, 28. The pin 60 passes completely through the thickness of the skin sections 26, 28 in order to create the stirring action required for FSW. The bobbin ring 62 includes an upper surface 68 that frictionally bears against the lower surface 27 of skin sections 26, 28 which provides heat tending to plasticize the material near the bottom surface 27. Additionally, the bobbin ring 62 acts as a backing plate to react against the downward force opposed on the upper surface 25 by the tool body 52. In this embodiment, the pin 60, bobbin ring 62 and tip 64 may be connected to a shaft (not shown) that is longitudinally shiftable within the tool body 52 so as to allow the bobbin ring 62 to be drawn upwardly against the bottom surface 27 while shoulder 66 of tool body 52 bears downwardly against the upper surface 25.

Figure 16:
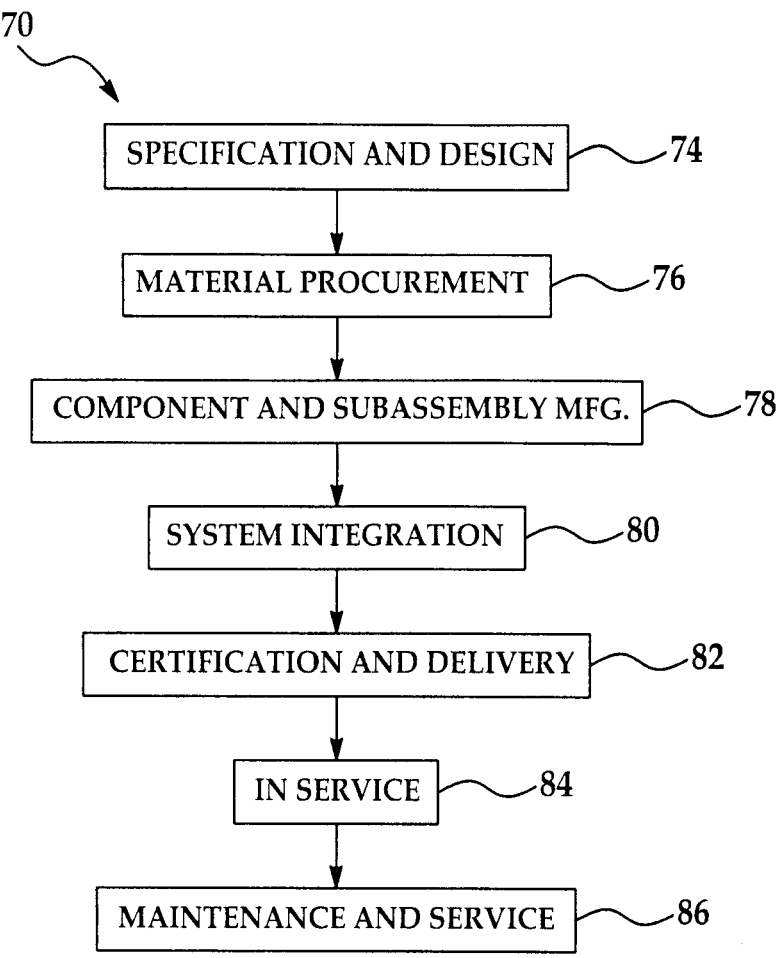
FIG. 16 is a flow diagram of aircraft production and service methodology.
Figure 17:
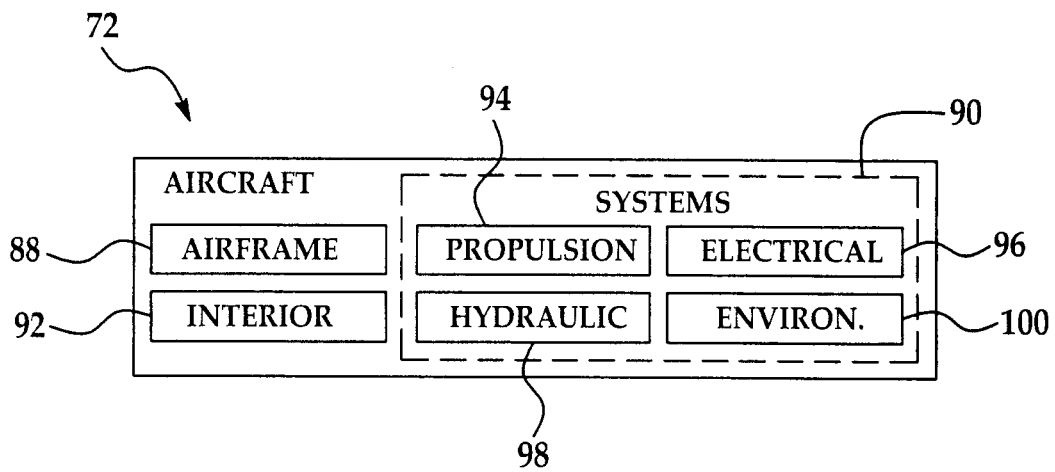
FIG. 17 is a block diagram of an aircraft.

Embodiments of the disclosure may find use in a variety of potential applications, particularly in the transportation industry, including for example, aerospace and automotive applications. Thus, referring now to FIGS. 16 and 17, embodiments of the disclosure may be used in the context of an aircraft manufacturing and service method 70 as shown in FIG. 16 and an aircraft 72 as shown in FIG. 17. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 70 may include specification and design 74 of the aircraft 72 and material procurement 76. During production, component and subassembly manufacturing 78 and system integration 80 of the aircraft 72 takes place. Thereafter, the aircraft 72 may go through certification and delivery 82 in order to be placed in service 84. While in service by a customer, the aircraft 72 is scheduled for routine maintenance and service 86 (which may also include modification, reconfiguration, refurbishment, and so on).

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 72 produced by exemplary method 70 may include an airframe 88 with a plurality of systems 90 and an interior 92. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the automotive industry.

Apparatus and methods embodied herein may be employed during any one or more of the stages of the production and service method 70. For example, components or subassemblies corresponding to production process 70 may be fabricated or manufactured in a manner similar to components or subassemblies produced while the aircraft 72 is in service. Also, one or more apparatus embodiments, method embodiments, or a combination thereof may be utilized during the production stages 78 and 80, for example, by substantially expediting assembly of or reducing the cost of an aircraft 72. Similarly, one or more of apparatus embodiments, method embodiments, or a combination thereof may be utilized while the aircraft 72 is in service, for example and without limitation, to maintenance and service 86.

Although the embodiments, of this disclosure have been described with respect to certain exemplary embodiments, it is to be understood that the specific embodiments are for purposes of illustration and not limitation, as other variations will occur to those of skill in the art.

What is claimed is:

1. A method of joining clad metal aircraft skins, comprising:
   removing a layer of clad material from an aircraft skin along an edge of the aircraft skin and from another aircraft skin along an edge of the other aircraft skin, the aircraft skin and the other aircraft skin including aluminum or aluminum alloy aside from the clad material;
   placing the edge of the aircraft skin in an edge-to-edge abutment with the edge of the other aircraft skin, an upper surface of the edge of the aircraft skin substantially abutting an upper surface of the edge of the other aircraft skin;
   friction stir welding the aircraft skin and the other aircraft skin along the edge-to edge abutment using a rotating pin tool, wherein removing the layer of clad material is sufficient to avoid interference with plastic deformation and recrystallization of the aluminum or aluminum alloy during the friction stir welding; and
   adding clad material along the edge of the aircraft skin and along the edge of the other aircraft skin where the layer of clad material was removed.

2. The method of claim 1, wherein the layer of clad material is removed by one of the following processes:
   pickling,
   chemical etching,
   mechanical abrasion,
   machining.

3. The method of claim 1, wherein adding clad material is performed by one of:
   air plasma spray,
   combustion powder spray,
   high velocity oxy fuel,
   cold spray,
   electric arc wire spray,
   combustion wire spray,
   ROKIDE® spray,
   flame spray.

4. The method of claim 1, wherein the friction stir welding includes holding the rotating pin tool against the surface of the skins in the area where the clad material has been removed.

5. The method of claim 1, wherein said aircraft skin and said other aircraft skin comprise an aircraft fuselage.

6. The method of claim 1, further comprising:
   forming the aircraft skin and the other aircraft skin into a desired shape before the welding is performed.

7. The method of claim 1, further comprising removing a layer of base metal from each of the skin sections beneath the layer of clad material.

8. The method of claim 1, wherein the friction stir welding is performed by:
   frictionally engaging opposite sides of the skin sections along the edge-to-edge abutment with first and second rotating shoulder tools,
   moving the first and second rotating shoulder tools along the length of the edge-to-edge abutment, and
   passing the rotating pin tool through the skin sections along the edge-to-edge abutment as the first and second rotating shoulder tools are moved along the length of the abutment.

9. A method of welding two clad metal fuselage skins, comprising:
   forming an abutment between opposing edges of the fuselage skins;
   removing a layer of cladding from one side of each of the skins along the abutment, an upper surface of each of said edges substantially abutting each other, the skins consisting of aluminum alloy aside from the layer of cladding; and,
   friction stir welding the edges of the skins together along the abutment after the layer of cladding has been removed, the friction stir welding using a rotating pin tool and removing the layer of cladding being sufficient to avoid interference with plastic deformation and recrystallization of the aluminum alloy during the friction stir welding; and
   adding cladding on the one side of each of the skins along the abutment where the layer of cladding was removed.

10. The method of claim 9, further comprising removing a layer of base metal from the skins beneath the layer of cladding.

11. The method of claim 9, wherein the friction stir welding is performed by:
   frictionally engaging opposite sides of the skins along the abutment with first and second rotating shoulder tools,
   moving the first and second rotating shoulder tools along the length of the abutment, and
   passing the rotating pin tool through the skins along the abutment as the first and second rotating shoulder tools are moved along the length of the abutment.

12. The method of claim 9, wherein removing the layer of cladding includes removing strips of the cladding along the opposing edges of the skins.

13. The method of claim 9, wherein the layer of cladding is removed by one of the following processes:
pickling,
chemical etching,
mechanical abrasion,
machining.

14. The method of claim 9, wherein adding cladding is performed using one of the following processes:
air plasma spray,
combustion powder spray,
high velocity oxy fuel,
cold spray,
electric arc wire spray,
combustion wire spray,
ROKIDE® spray,
flame spray.

15. The method of claim 9, wherein said fuselage skins comprise an aircraft fuselage.

16. The method of claim 9, further comprising:
forming the skin sections into a desired shape before the welding is performed.

17. A joining method comprising:
placing edges of clad metal skin sections of an aircraft fuselage in facing relationship to form an abutment between the skin sections;
removing a strip of material from one side of each of the clad metal skin sections along the abutment, including removing a layer of cladding along the strip and removing a layer of metal underlying the layer of cladding along the strip, an upper surface of each of the edges substantially abutting each other and the clad metal skin sections consisting of aluminum alloy aside from the layer of cladding; and
friction stir welding the edges of the clad metal skin sections together along the abutment after the layer of cladding has been removed, wherein friction stir welding the edges of the clad metal skin sections together includes:
frictionally engaging the opposite side of each of the skin sections along the abutment with a rotating shoulder tool,
moving the rotating shoulder tool along the length of the abutment, and
passing a rotating pin tool through the skin sections along the abutment as the rotating shoulder tool is moved along the length of the abutment, wherein removing the layer of cladding is sufficient to avoid interference with plastic deformation and recrystallization of the aluminum alloy during the friction stir welding; and
adding cladding along the length of the abutment on the one side of the skin sections in the area where the strip of material has been removed.

18. The method of claim 17, wherein the layer of cladding is removed by one of the following processes:
pickling,
chemical etching,
mechanical abrasion,
machining.

19. The method of claim 17, wherein adding cladding is performed using one of the following processes:
air plasma spray,
combustion powder spray,
high velocity oxy fuel,
cold spray,
electric arc wire spray,
combustion wire spray,
ROKIDE® spray,
flame spray.

20. The method of claim 17, further comprising:
forming the skin sections into a desired shape before the welding is performed.

* * * * *